March 26, 1935.  A. SHATKIN  1,995,364
METHOD FOR MAKING SHEET METALWARE JOINTS
Filed April 26, 1933

Fig. 6. Fig. 7. Fig. 8. Fig. 9.
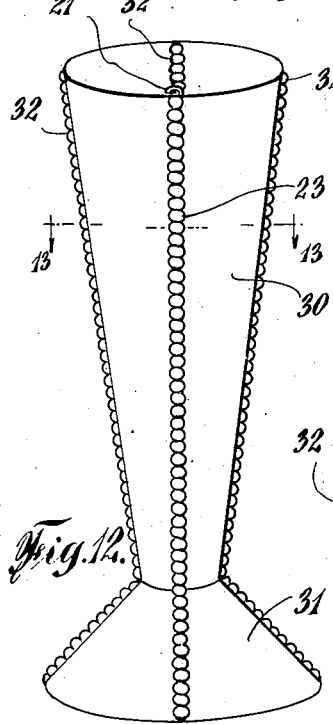
Fig. 12.
Fig. 10.
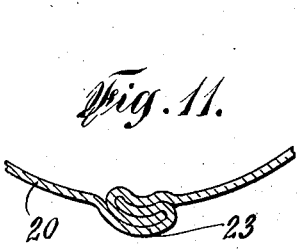
Fig. 11.
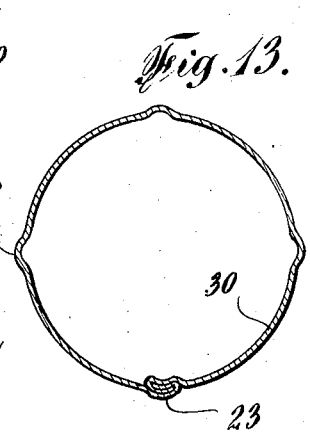
Fig. 13.
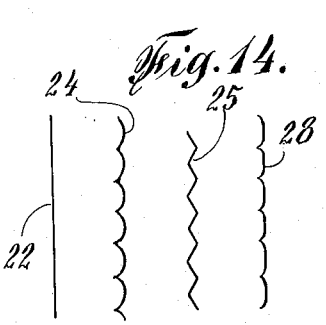
Fig. 14.
INVENTOR-
Aaron Shatkin
BY
ATTORNEY- Patented Mar. 26, 1935

1,995,364

UNITED STATES PATENT OFFICE 1,995,364

METHOD FOR MAKING SHEET METALWARE JOINTS

Aaron Shatkin, Brooklyn, N. Y.

Application April 26, 1933, Serial No. 667,985

2 Claims. (Cl. 41—24)

My present invention relates to a method for making sheet metal joints, and in particular to a method for joining the meeting edges of sheet metal fabrications, as in straight and tapered tubes, cone portions and other forms in sheet metal which make up the component parts of candle sticks, salt shakers, vases, and similar class of articles included in the category commonly called "silverware".

Seaming the meeting edges in components of silverware articles, is usually done by soldering, at best an expensive process requiring more than an ordinary degree of skill, and presenting a pertinent objection in that the heat of the flame burns the metal causing black spots therein which are difficult to remove, and further causing a softening of the metal in the regions heated. In fact, when the metal is of the thinner gauges, soldering especially with hard solder, presents great difficulties. Then again, when the meeting edges to be joined are seamed by clinching, the visible line of the seam thus resulting, is seriously objectionable in silverware, which is a class including articles of great utility, yet their desirability is proportionate to appearance.

The principal object of my present invention is to provide a novel and improved method of the character mentioned, which will overcome the foregoing objections.

A further object of this invention is to provide a novel method of the type mentioned, whereby joints of exceptional strength are attained.

To accomplish these objects, I provide a method wherein the meeting edges are first seamed by clinching, and then I so emboss the metal along the line of the seam, such that the line of the seam falls within the design scheme of the embossing, or else, the line of the seam is distorted to conform with the scheme of the design embossed; the embossed figures lying along, about or across the line of the seam.

It is intended and desired that the matter shown herein be deemed illustrative and not restrictive, and that the patent shall cover whatever features of patentable novelty exist in the invention disclosed; reference being had to the appended claims rather than to the specific description herein to indicate the scope of the invention.

In the accompanying drawing, forming part of this application, similar characters of reference indicate corresponding parts in all the views.

Fig. 6 is a view similar to that shown in Fig. 2, but the seam line of which is but little distorted; being that same practically coincides with the end line of the embossed design which is a series of squares set end to end.

Fig. 7 is a side view of the Fig. 6.

Fig. 8 is a view similar to that shown in Fig. 2, but the seam line of which is included within the embossed design; the metal of the tube being embossed about the seam line.

Fig. 9 is a side view of the Fig. 8.

Fig. 10 is an enlarged fragmentary section of the clinched joint taken at line 10—10 in Fig. 1.

Figure 2:
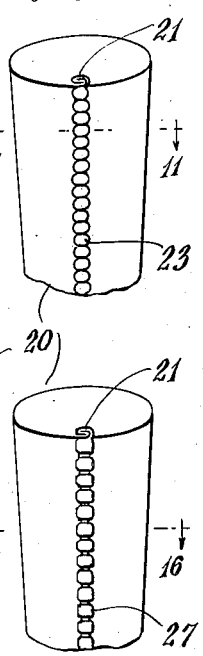
Fig. 2 shows a fragmentary perspective view of the tube shown in Fig. 1, which has been dealt with in accordance with the method which is the subject of this invention, whereon I have embossed or crimped the metal layers of the clinched seam with a design to emulate a string of pearls; the seam line having been distorted to conform to the design scheme.
Figure 3:
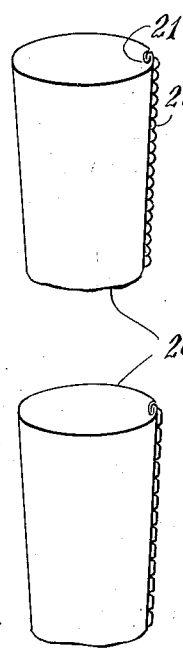
Fig. 3 is a side view of the Fig. 2.
Figure 4:
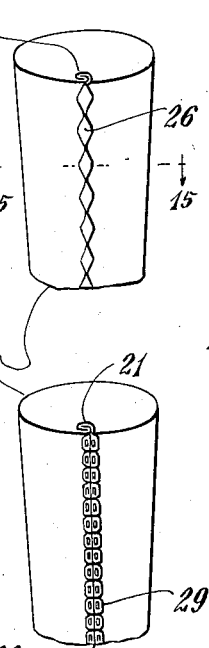
Fig. 4 is a view similar to that shown in Fig. 2, but the seam line of which has been distorted to conform to another type of design, namely, a series of quadrilaterals set vertex to vertex.
Figure 5:
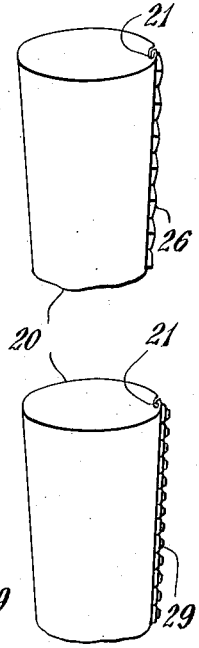
Fig. 5 is a side view of the Fig. 4.

Fig. 11 is an enlarged fragmentary section of the embossed clinched joint taken at either line 11—11 in Fig. 2, or at line 15—15 in Fig. 4, or at line 16—16 in Fig. 6.

Fig. 12 shows in perspective a vase made of two components, each of which individually has been made by the method which is the subject of this invention.

Fig. 13 is an enlarged section taken at line 13—13 in Fig. 12.

Fig. 14 shows a straight and several distorted seam lines.

Figure 1:
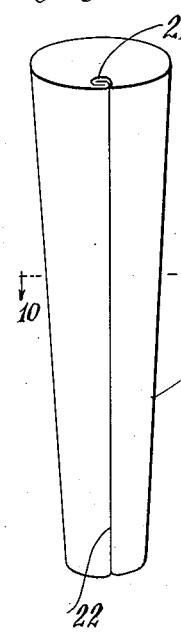
Fig. 1 shows in perspective a tube made of sheet material, the meeting edges of which are clinch seamed.

The meeting edges in the tube 20, shown in Fig. 1, were brought together and clinched in a seam 21, presenting on the exterior of the tube, the straight seam line 22. Now, I emboss figures along the seam line 22, through the layers of metal in the seam 21, thereby materially strengthening the seamed joint, and in Fig. 2, these embossed figures are a series of tangent circles, or in reality segments of spheres, to form a pearl string design 23, but at the same time, the seam line which originally was straight line 22, is distorted to a form as the line 24, so that it fall within the scheme of the design 23. The style of the embossed design may be as is shown in Fig. 4, wherein the seam line is distorted to be a line 25, so that it conform to the scheme of the design 26. The same may be said of the design 27, embossed along the seam line as shown in Fig. 6, wherein the seam line is distorted to be a line 28, so that it fall in and conform to the design scheme, or, should the longitudinal end lines of this design 27, be absolutely straight, then, in such event the seam line would be part of the design scheme and in the embossing operation, it would in no manner be touched, for it would, as is, conform to the design scheme. Should the design embossed be of the scheme shown in Fig. 6, then the seam line 22, is untouched, while the metal is embossed on both sides of same, and the resulting design 29, would naturally include the straight seam line 22.

For symmetry, when components 30 and 31, of the vase shown in Fig. 12, are made in accordance with the method described herein, lines of design similar to that embossed along the line of the seam, are likewise embossed along the metal in lines in symmetrical relation with the line of the seam 21. These embossed lines included for the sake of symmetry, are indicated by the numerals 32.

I claim:—

1. The method of making sheet metalware joints, which consists of bringing the meeting edges together, seaming the meeting edges by clinching, and then embossing cupped figures along the seam line whereby the seam line is distorted to coincide with part of the perimeter lines of the figures embossed.

2. The method of making sheet metalware joints, which consists of bringing the meeting edges together, seaming the meeting edges by clinching, and then embossing cupped figures through the layers of the seam along the seam line whereby the seam line is distorted to coincide with part of the perimeter lines of the figures embossed.

AARON SHATKIN.